(12) United States Patent
Cawley et al.

(10) Patent No.: US 9,619,866 B2
(45) Date of Patent: Apr. 11, 2017

(54) IMAGE TRANSFORMATION

(71) Applicants: Robin Alexander Cawley, Cambridge (GB); Colin Skinner, Cambridge (GB)

(72) Inventors: Robin Alexander Cawley, Cambridge (GB); Colin Skinner, Cambridge (GB)

(73) Assignee: DISPLAYLINK (UK) LIMITED, Cambridge (GB)

( * ) Notice: Subject to any disclaimer, the term of this patent is extended or adjusted under 35 U.S.C. 154(b) by 0 days.

(21) Appl. No.: 14/653,809

(22) PCT Filed: Dec. 13, 2013

(86) PCT No.: PCT/GB2013/053291
§ 371 (c)(1),
(2) Date: Jun. 18, 2015

(87) PCT Pub. No.: WO2014/096790
PCT Pub. Date: Jun. 26, 2014

(65) Prior Publication Data
US 2015/0324955 A1    Nov. 12, 2015

(30) Foreign Application Priority Data
Dec. 21, 2012    (GB) .................................. 1223334.2

(51) Int. Cl.
*G06T 3/60* (2006.01)
*G06T 1/60* (2006.01)
*H04N 1/387* (2006.01)

(52) U.S. Cl.
CPC .................. *G06T 3/60* (2013.01); *G06T 1/60* (2013.01); *G06T 3/602* (2013.01); *H04N 1/387* (2013.01); *H04N 1/3877* (2013.01)

(58) Field of Classification Search
None
See application file for complete search history.

(56) References Cited

U.S. PATENT DOCUMENTS

| | | | |
|---|---|---|---|
| 4,806,920 A | 2/1989 | Sawada | |
| 6,307,966 B1 | 10/2001 | Chapin | |
| (Continued) | | | |

FOREIGN PATENT DOCUMENTS

| | | |
|---|---|---|
| EP | 1507249 A1 | 2/2005 |
| JP | 2000322566 A | 11/2000 |

OTHER PUBLICATIONS

International Search Report and Written Opinion issued in International Application PCT/GB2013/053291, mailed Mar. 20, 2014.
(Continued)

*Primary Examiner* — Jwalant Amin
(74) *Attorney, Agent, or Firm* — Mintz Levin Cohn Ferris Glovsky and Popeo, P.C.

(57) ABSTRACT

A method, at a display control device, for transforming image data, the method comprising receiving portions of image data from a host device, wherein the portions of image data are based on tiles of an image, wherein the image comprises tiles in a tile order, each tile comprising pixels in a pixel order, and receiving display order information provided by host device, wherein the display order information provides an order for providing the portions of image data to a display device and generating different image data having a different tile order based on the display order information, and a different pixel order and providing the different image data the display device for displaying a transformed image.

20 Claims, 11 Drawing Sheets

(56) References Cited

U.S. PATENT DOCUMENTS

2001/0017946 A1 8/2001 Klassen
2006/0072147 A1 4/2006 Kanno
2006/0215200 A1 9/2006 Mutsuro et al.

OTHER PUBLICATIONS

UK Intellectual Property Office Search Report issued in GB Application No. GB1223334.2, mailed Jun. 11, 2013.

IMAGE TRANSFORMATION

CROSS-REFERENCE TO RELATED APPLICATION

This application is a national stage application, filed under 35 U.S.C. §371, of PCT Application No. PCT/GB2013/053291, filed on Dec. 13, 2013, the contents of which are incorporated herein by reference in their entirety for all purposes.

The present invention relates to apparatus and methods for transforming image data, and more particularly for transforming image data sent from a host device to a raster format display device, and still more particularly for transforming image data at a display device based on information sent by a host device.

On flat screen devices, such as an LCD or OLED display device, the position of connectors for delivering image data to the screen is fixed and the screen is generally configured to display image data received via the connectors in a fixed orientation dependant on the position of the connectors. That is, the connectors and the displayed image have a fixed relationship.

Positioning the connector above the image to be displayed is not always desirable for manufacturing and aesthetic purposes. When the screen is built into a display unit such as a desk top computer, it may be desirable for the signal cables to connect to the screen through the bottom of the display unit. Providing a connection at the top of the display unit would require the cables to lead up the side of the display unit, increasing the thickness of the unit, which may increase manufacturing complexity and/or be aesthetically undesirable.

For a standard raster format display system in which both writes and reads image data in a normal read order (top left to bottom right, as illustrated in FIG. 8), inputting the image data beneath the image display area has the unwanted side-effect that the image is displayed in an inverted format (as illustrated in FIG. 9). To address this problem, it has been proposed to provide software at the host side to generate the display in a desired display orientation or to invert the inverted image prior to transmitting the image to the display device. Such software is not available on all operating systems. Even when it is available, a user input is required to cause the operating system to generate a re-oriented display. This poses problems for non-technical users of computers, and may have a negative impact on the profit margins of flat screen manufacturers.

Accordingly, the inventors in the present case have recognised that there is a need for an apparatus and methods for automatically transforming an image which is generated by a host device in an undesirable orientation, so that the image may be displayed in a desirable orientation without requiring a user to request a correction.

The present invention and embodiments thereof seeks to address at least these problems.

In display systems such as those sold by DisplayLink, image data is compressed by a proprietary driver running on a host computer. In a possibility, image transforms could be performed while compressing the data. However, the processing power for use by the compression system is a scarce resource, use of which should be reduced if possible. Therefore, a highly optimised compression system is provided, which can make use of specialized array instructions provided on modern computers for the purposes of data compression and similar operations. Such array instructions have inherent directionality: they process blocks of data in increasing address order, which correlates with the normal direction of reading the image. Image compression software which has an implicit inversion, rotation or other transform built in to it would be more complex and slower than compression software dedicated to a single display/read direction. Similarly, transforming the image before compression has a cost in processing power and storage.

DisplayLink systems may compress images in the form of rectangular (for example) tiles. It is desirable that the decompression system in the display side apparatus (an asic in the case of DisplayLink, but not necessarily so) has at least one buffer equal to the width of the screen times the height of a tile so that a whole row of tiles can be decompressed before being displayed row by row in raster format. In one possibility, a display device has a compressed frame buffer which can store compressed tiles containing compressed image data. The utility of having storage for two images is that one image may be displayed while the other is being updated. The tiles are fed to a decompression system in an appropriate order to generate the desired image. For a normal, non-transformed, image, it may be sufficient to put the tiles into the compressed frame buffer in the order they are needed, and to read them out in the same order. However, in order to allow for partial updates of the image, rather than automatically reading the tiles linearly (in increasing address order), the display control device may have a table of pointers to tiles, capable of pointing to tiles within the compressed frame buffer in any non-linear order which may be needed.

The inventors in the present case have recognised that compiling a tile list in the host computer after image compression but before transmitting the image data provides an efficient alternative to changing the highly optimised compression code. In particular, a tile order of an image may be reordered, so that the first tile is provided last and the last first. So far, each row tile has its image (pixel) data in the original orientation, which would result in a display having a "Venetian blind" effect. However, the inventors have appreciated that by providing a modified display-end buffer arrangement, the pixel order may also be changed to provide a fully transformed image.

By changing the tile order based on display order information received from the host and by changing the pixel order using hardware or software in the display control device, the image may be fully transformed in a manner which reduces additional image processing on the host side.

A similar process can be used to achieve a 90 degree image rotation in either direction to allow displays which are naturally in landscape mode to display in portrait mode or vice versa. A modified tile order is provided by way of display order information supplied by the host device, and the pixel data for each tile is reordered in a display buffer.

Examples of the invention may be implemented in software, middleware, firmware or hardware or any combination thereof. Embodiments of the invention comprise computer program products comprising program instructions to program a processor to perform one or more of the methods described herein, such products may be provided on computer readable storage media or in the form of a computer readable signal for transmission over a network. Embodiments of the invention provide computer readable storage media and computer readable signals carrying data structures, media data files or databases according to any of those described herein.

Apparatus aspects may be applied to method aspects and vice versa. The skilled reader will appreciate that apparatus embodiments may be adapted to implement features of method embodiments and that one or more features of any of the embodiments described herein, whether defined in the body of the description or in the claims, may be independently combined with any of the other embodiments described herein.

In a first aspect, there is provided a method, at a display control device, for transforming image data, the method comprising receiving portions of image data from a host device, wherein the portions of image data are based on tiles of an image, wherein the image comprises tiles in a tile order, each tile comprising pixels in a pixel order, and receiving display order information provided by host device, wherein the display order information provides an order for providing the portions of image data to a display device, and generating different image data having a different tile order based on the display order information, and a different pixel order, and providing the different image data the display device for displaying a transformed image.

As desired herein, there is provided a method wherein the different tile order is the reverse of the tile order based on the display order information, and the different pixel order is the reverse of the pixel order, to provide fully inverted image data to the display device.

Also as described herein, there is provided a method wherein the tile order is based on a tile row order and the pixel order is based on a pixel row order, and the different tile order is based on a tile column order and the different pixel order is based on a pixel column order, to provide different image data corresponding to a 90 degree inversion of the image data.

Also as described herein, there is provided a method wherein receiving the portions of image data comprises receiving compressed tiles, each compressed tile being based on a tile, the method comprising providing the compressed tiles to a decompressor in an order different to the tile order, wherein the different order is based on the display order information and, for each compressed tile, decompressing the compressed tile to provide decompressed pixel data, and providing the decompressed pixel data to the display device in a different pixel order.

Also as described herein, there is provided a method comprising reading decompressed pixel data from the decompressor in a first order and writing the decompressed pixel data to a display buffer in a second order, the second order different from the first order to provide a different pixel order.

In a second aspect, there is provided a method, at a host device, for providing to a display device portions of image data, the portions of image data being based on tiles of an image, wherein the image comprises tiles in a tile order, each tile comprising pixels in a pixel order, and display order information listing an order for providing the portions of image data to a display device to allow display of transformed image data, the method comprising maintaining, at the host device, a map of the memory allocation of display control device memory, receiving a portion of image data, determining display order information for the portion of image data based on the map and on a required image data transformation, sending the portion of image data and the display order information to the display control device and updating the map.

Also as described herein, there is provided a method comprising generating display order information instructing the display control device to provide the portions of image data to the display device in an order which is the reverse of the tile order to allow display of an inverted image.

Also as described herein, there is provided a method wherein the tile order is based on a tile row order, comprising generating display order information instructing the display control device to provide the portions of image data to the display device in an order based on a tile column order, to allow display of an image inverted through 90 degrees.

Also as described herein, there is provided a method comprising compressing the portion of image data and sending it to the display control device, wherein sending the portion of image data comprises sending the compressed portion of image data.

There is also provided a method of transforming image data substantially as herein with reference to the drawings.

In a further aspect, there is provided a processing device configured to perform a method as described above.

In a still further aspect, the invention provides a computer readable medium including executable instructions which, when executed in a processing system, cause the processing system to perform a method as described above.

Another aspect of the invention provides a display system comprising a host device configured to perform a method as described herein, a display control device configured to perform a method as described herein, and a display coupled to the display control device and configured to display the image.

Embodiments of the invention will now be described in greater detail, by way of example only, with reference to the accompanying drawings, in which.

The following description provides an overview of a possible display system for implementing an image transformation as described herein. Method and apparatus for implementing an image transformation are then described.

Figure 1:
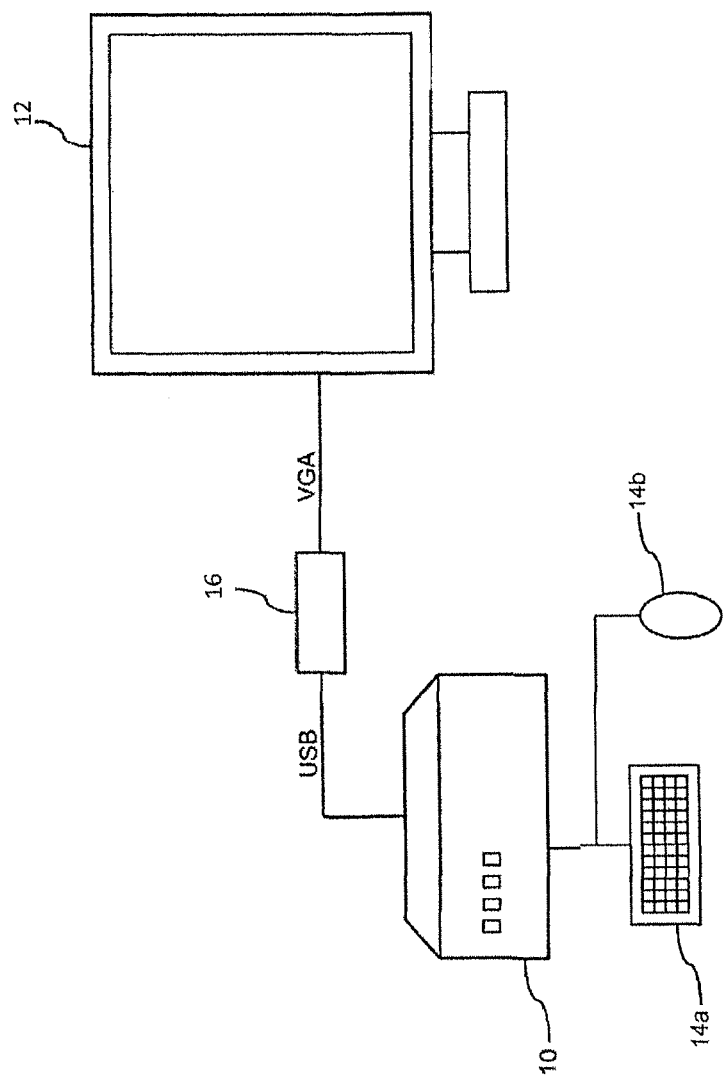
FIG. 1 shows a schematic diagram of components of a display system.

A display system is shown in FIG. 1. The system comprises a processing device 10, a display device 12 and user interface devices 14. The user interface devices are a keyboard 14a and a mouse 14b. The system shown in FIG. 1 is a standard desktop computer, with a display device 12, which is composed of discrete components that are locally located but could equally be a device such as a laptop computer or suitably enabled handheld device such as a mobile phone or pda (personal digital assistant) all using an additional display. Similarly, the system may comprise part of a networked or mainframe computing system, in which case the processing device 10 may be located remotely from the user input devices 14 and the display device 12, or indeed may have its function distributed amongst separate devices.

The display device 12 shows images, and the display of the images is controlled by the processing device 10. One or more applications are running on the processing device 10 and these are represented to the user by corresponding application windows, with which the user can interact in a conventional manner. The user can control the movement of a cursor about the images shown on the display device 12 using the computer mouse 14b, again in a totally conventional manner. The user can perform actions with respect to any running application via the user interface device 14 and these actions result in corresponding changes in the images displayed on the display device 12.

The operating system run by the processing device 10 uses virtual desktops to manage the or multiple display devices 12. The physical display device 12 is represented by a frame buffer that contains everything currently shown on that display device 12. In order to allow the display device to be connected to a USB port on the processing device 10, rather than the standard FGA port, as would be the case if the display device 12 is a secondary display device, the processing device 10 connects to the secondary display device 12 via a display control device 16. The display control device 16 is connected to the processing device 10 via a standard USB connection, and appears to the processing device 10 as a USB connected device. Any communications between the processing device 10 and the display control device 16 are carried out under the control of a USB driver specifically for the display control device 16. Such devices allow the connection of the secondary display device 12 to the processing device 10 without the need for any hardware changes to the processing device 10.

The display control device 16 connects to the display device 12 via a standard VGA connection, and the display device 12 is a conventional display device 12 which requires no adjustment to operate in the display system shown in FIG. 1. As far as the display device 12 is concerned, it could be connected directly to the graphics card of a processing device; it is unaware that the graphical data displayed by the display device 12 has actually been first sent via a USB connection to an intermediate component, the display control device 16. Multiple additional display devices 12 can be is connected to the processing device 10 in this way, as long as suitable USB slots are available on the processing device 10.

The display control device 16 is external to the processing device 10 and is not a graphics card. It is a dedicated piece of hardware that receives graphical data via the USB connection from the processing device 10 and transforms that graphics data into a VGA format that will be understood by the display device 12. In topological terms USB and VGA are only examples of data standards that can be used to connect the additional display device 12 to the processing device 10. The general principle is that a general-purpose data network (such as USB or Ethernet) connects the processing device 10 to the display control device 16 and a display-specific data standard (such as VGA or DVI) is used on the connection from the display control device 16 to the display device 12.

Figure 2:
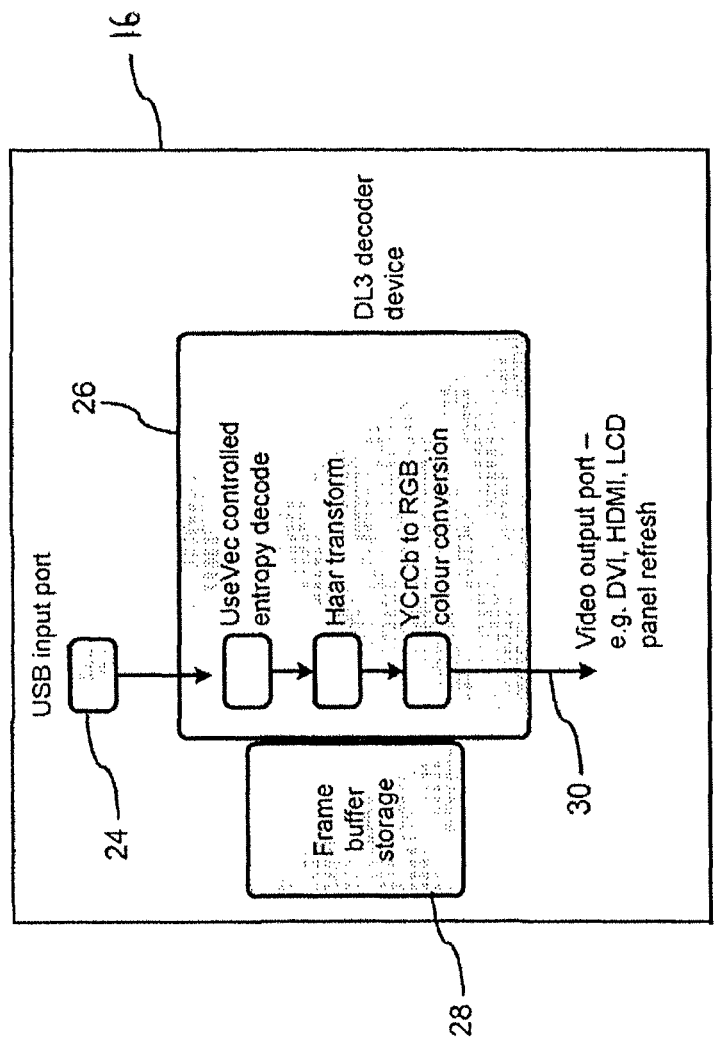
FIG. 2 shows a schematic diagram of a display control device used in the display system of FIG. 1.

The display control device 16 is shown in more detail in FIG. 2. The device 16 operates to receive encoded display data via a USB input port 24, which is processed with a processor 26 that is connected to a frame buffer 28 and provides an output via an output port 30. The device 16 is for generating the image that is displayed by the display device 12. The device 16 is effectively an image decoder, as it receives encoded display data which is then decoded to pixel data that is stored within the frame buffer 28.

The display control device 16 is a lightweight piece of hardware for adding an additional display 12 to a computer 10.

The incoming signal received by the USB input port 24 comprises encoded display data for one or more pixel tiles or groups of pixel tiles within the image to be displayed and also position data for each of the pixel tiles or groups of pixel tiles in the image. It will be appreciated that the image can be subdivided into any portion of display data that is less than the display data for an entire image, and reduces the amount of data that has to be transmitted between the computer 10 and the display control device 16. A pixel tile comprises an 8×8 array of pixels and the group size could be sixteen pixel tiles, for example, in a 4×4 array of tiles. However, any appropriate portion, or atom, of display data could be used. Often, only an update of part of the image is being sent.

The processor 26 takes the encoded tiles and decodes these tiles into pixel data and updates the frame buffer 28 with the new decoded pixel data is according to the position data in the received signal. In this way, the frame buffer 28 will always maintain pixel data for the entire image, and this pixel data is continuously being updated by the processor 26. The processor 26 will then output at least a portion of the frame buffer contents via the output port 30 to the display device 12 over the VGA connection. The display control device 16 is configured as a dedicated piece of hardware for the decoding process.

In a preferred embodiment, the video decoding device (embodied as a silicon chip or an end user product) receives an encoded video signal, decodes the video signal, and outputs the decoded signal to a video display device over a video link such as HDMI, DVI, DP, such that the encoded signal arrives over some variant of the USB interface as standardised by the U SB-IF, and the encoded signal makes use of the Haar transform for each 8×8 pixel square of the source images, in each colour channel, AC coefficients of each Haar transform are encoded as variable length bit fields, where the variable encoding is defined using a simple and compact UseVec form (consistent with the definition in the background section). The AC coefficients are ordered so that trailing coefficients represent highest-frequency data, and trailing zero coefficients may be omitted; the colour channels are all at the same resolution, with no subsampling of chroma channels being performed, except as dynamically determined by the number of coefficients provided to the Haar transforms. The encoded signal format is divided into groups of 8×8 tiles so that partial updates of video frame may be performed. Each tile group separately identifies its intended location in the displayed image so that local changes to not require a complete frame update. Each tile group contains fewer than twenty 8×8 tiles and the decoded signal is sent to a video raster display port such as HDMI, DVI, DisplayPort, or is displayed directly on a is visual display which forms part of the device.

FIG. 2 shows one embodiment of the display control device 16, which includes a dedicated frame buffer 28 provided by, for example Random Access Memory (RAM). In other solutions, the frame buffer 28 may not be part of the device 16, but may be present on another separate chip, in which case the processor 26 writes to that frame buffer 28 via a suitable external output port. The device 16 may not be a separate device as shown in FIG. 1, but may form part of the actual display device 12. In this case, the output device 30 is not an output port as such, but is the actual display device 12, which is written directly from the frame buffer 28.

As mentioned above, the frame buffer 28 stores portions of data that, together, form the complete image. Position data that is sent indicates to the processor 26 the position of the portions of data within the image, so that, when they are decoded, the complete image can be formed.

Figure 3:
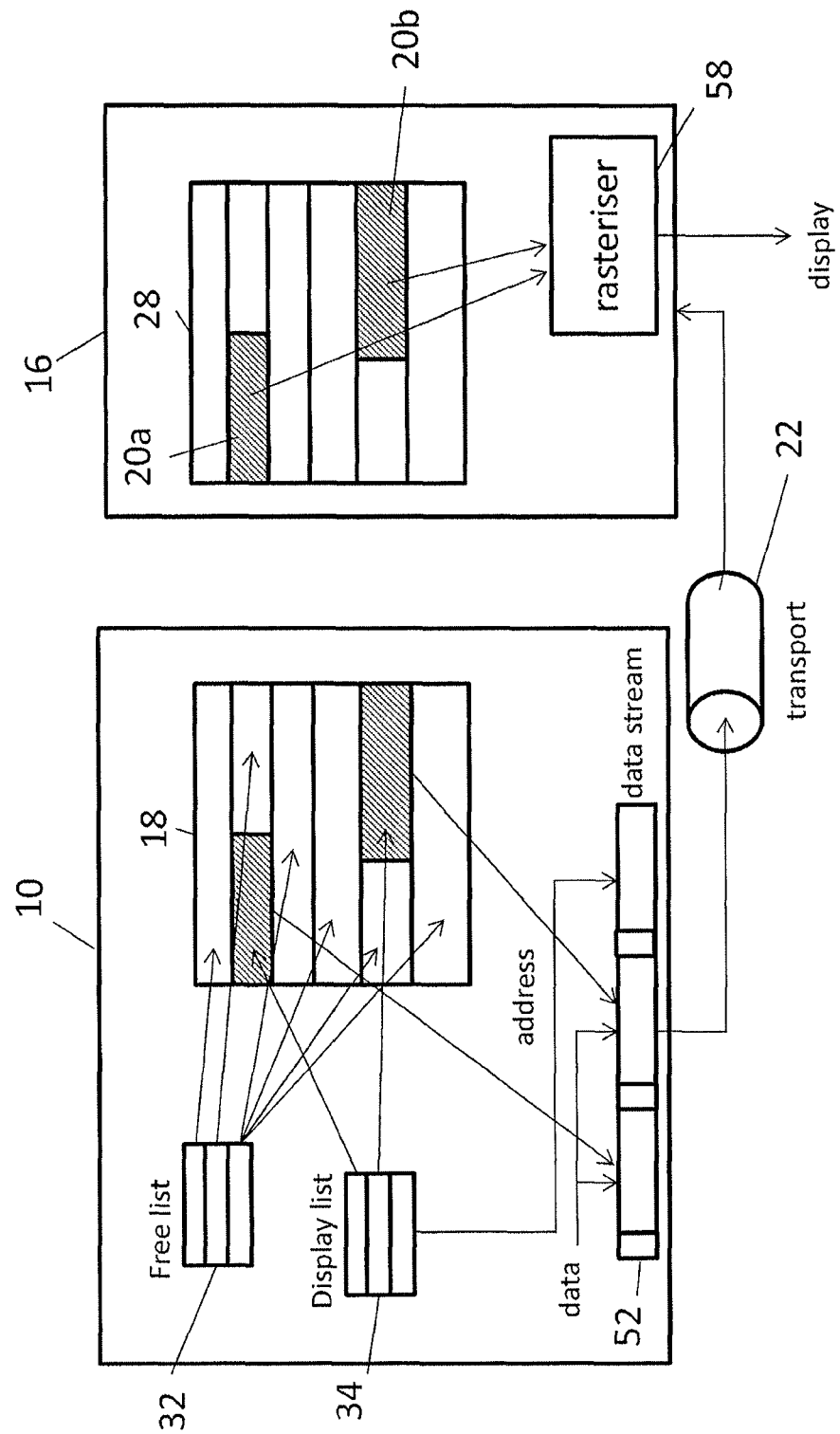
FIG. 3 shows a schematic diagram of one embodiment of a buffer memory management system used in the display system of FIG. 1.

Nevertheless, managing the frame buffer 28 in order to make efficient use of its memory space, is required. As shown in FIG. 3, the frame buffer 28 includes space for a number of different portions 20 of display data. The portions 20 may be of different sizes, as shown, particularly if they constitute updates of part of the image. It is therefore desirable that the different sized portions are efficiently packed into the frame buffer 28, so that the least amount of space is wasted between different portions 20. For example, the portion of data 20b would not fit into the space next to portion 20a, since it is portion 20b is too big for that space. However, another portion of data may fit into that space next to portion 20a, and it would be more efficient to store it in that space, rather than on another row in the frame buffer 28.

As shown in FIG. 3, in one embodiment, the processing device 10 (the host device), is arranged to include a map 18 corresponding to the frame buffer 28. The map is updated to indicate where, in the frame buffer 28, portions 20 of display data have been stored, so that the processing device 10 can best determine where to store further portions 20 of display data. The processing device 10, where the portions of data are encoded, and/or compressed, determines the size of the portion of data to be sent to the device 16 for storage in the frame buffer 28, the size being variable for different portions 20 of data. The processing device then determines a location on the map 18 where the portion 20 of data would fit in the frame buffer 28. For example, the processing device 10 may maintain a free space list 32, in which the free spaces in the map 18 are included, together with the sizes of the free spaces. The processing device 10 can then easily determine which is the smallest free space into which the portion of data can fit, thereby maximising the packing efficiency. The address in the frame buffer 28 corresponding to that location in the map 18 is then sent to the display control device 16, together with the portion of data, via a transport mechanism 22 and the location on the map 18 is updated to indicate that the corresponding address(es) in the frame buffer 28 are now full. The transport mechanism 22 can be any appropriate transport protocol for transferring the display data, and can include packaging the portions of display data into packets, together with the addresses (and other information), as required.

As mentioned above, the processing device 10 also maintains a list 34 of the portions of data with the order in which they are to be accessed to form the image to be displayed. The list 34 (or at least the information therein, i.e. the order in which the portions of display data stored at particular addresses in the frame buffer 28 are to be accessed and displayed) is also sent to the device 16. As shown in FIG. 3, the portions of data, together with their assigned addresses, are inserted into a data stream 52, as is the display list 34, for transfer to the transport mechanism 22 for transport to the display control device 16. Therefore, the different portions of the image can then be sent in the correct order to a rasteriser 58 in the display control device 16, from where the image is sent to the display.

It will be appreciated that the display control device may have more than one frame buffer, for example two (or more) frame buffers, which may be provided in the same RAM or in different RAMs. In such a case, of course, the map 18 would map all the frame buffers and there would be separate display lists 34 for each frame buffer to provide the display order for each display buffer. Furthermore, the different frame buffers may be the same size or may have different sizes. If desired, a separate map 18 could be provided for each frame buffer, whether or not they are provided in the same or different RAMs. Each frame buffer may store a frame of image data, so that one frame buffer is being read out and displayed while the second frame buffer is being filled with the next image. Furthermore, as mentioned above, the display data may be compressed by the processing device and sent to the display control device in compressed form. The received compressed data can then be stored in the frame buffer without decompression, and the may only be decompressed when needed for display.

Alternatively, the RAM in the display control device may not be specifically separated into individual frame buffers, but may have one or more memory spaces such that different portions of compressed data of different frames can be sent to addresses in the same memory space such that portions of one frame may be mixed up with portions of another frame. The list 34 sent to the display control device then provides to the display control device the information regarding an order in which the portions of display data in the memory space are to be accessed from the memory space for individual frames and combined to display an image on the display. The display control device can access from the memory the compressed portions of display data for one frame while receiving and storing in the memory compressed portions of display data for another frame.

If desired, the display control device can determine free space available in its memory, and send feedback indicative of the available free space to the host device. The host device then receives the feedback and updates the map based on the feedback.

Alternatively or additionally, if desired, the display control device can determine quality of a previous portion of display data received from the host device, and send feedback indicative of the quality of the previous portion of display data to the host device. The host device then receives the feedback from the display control device regarding quality of a previous portion of display data and updates the map based on the feedback.

In an embodiment, the host device can determine, based on the map, that the display control device memory requires defragmentation, and can send appropriate instructions to the display control device to perform a defragmentation procedure, and can update the map accordingly. The display control device receives the instructions from the host device, and performs a defragmentation of the memory in response to receiving the instructions.

Figure 4:
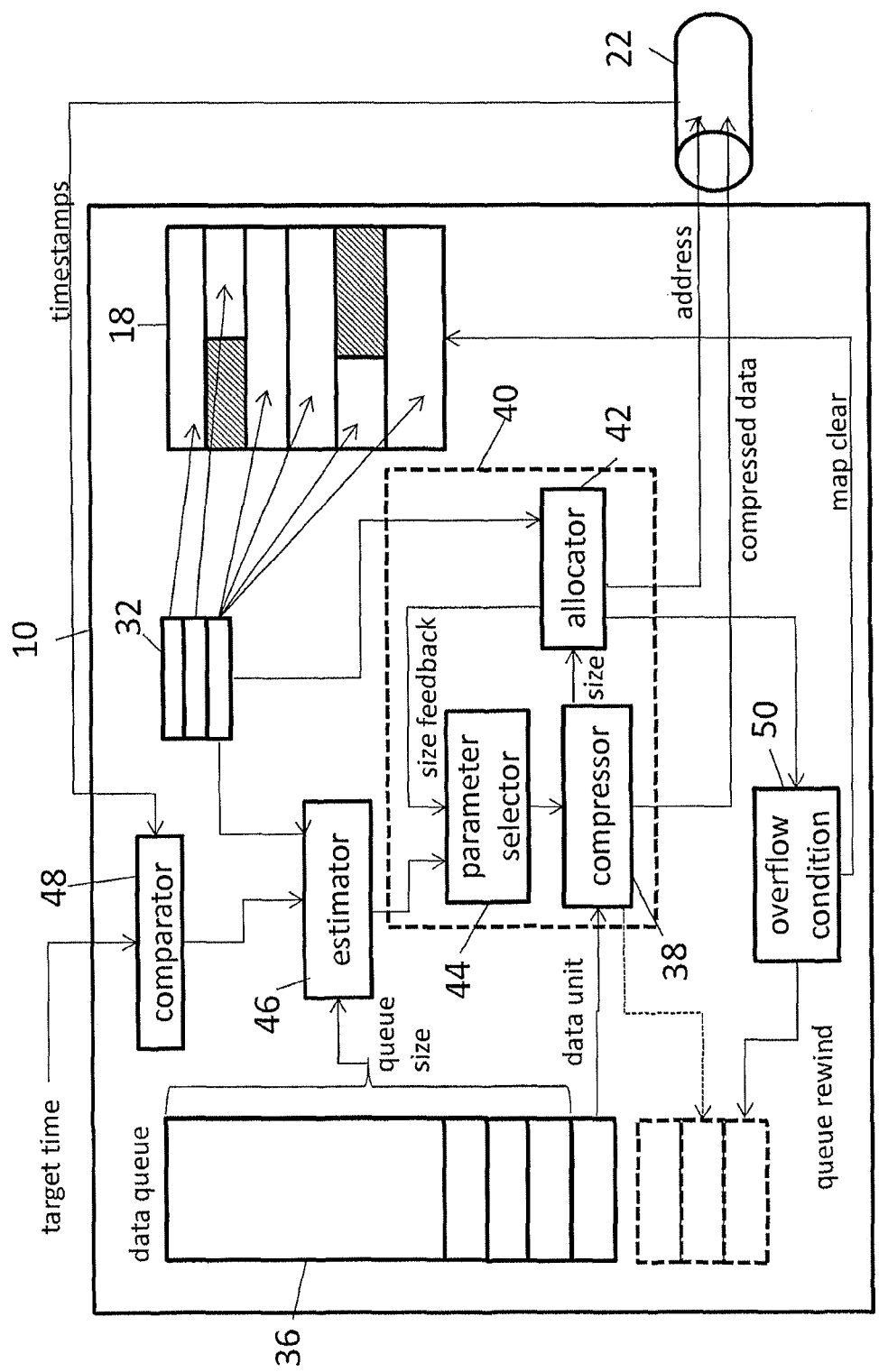
FIG. 4 shows a schematic diagram of part of a processing device used in the buffer memory management system of FIG. 3.

FIG. 4 shows one embodiment of part of the processing device 10 of FIG. 3 in more detail. As can be seen, the data is initially held in a data queue 36, from where individual portions of data are passed to a compressor 38 forming part of a compression unit 40. After compression, the compressed portion of data is passed to the transport mechanism 22 for transfer to the display control device 16. However, as mentioned above, once the portion of data is compressed, the size of the compressed portion of data is passed to an allocator 42, which determines (preferably, but not necessarily, from the map 18, using the free space list 32) which is the best free space into which the portion of data can fit.

The address in the frame buffer 28 corresponding to that location in the map 18 is then sent to the display control device 16.

Furthermore, however, the allocator 42 can determines the available free space and can feed the available size of free space back to a parameter selector 44, where compression parameters, such as compression parameters, are selected for the compressor 38 to use in compressing the data portion. In this way, for example, if the compressed portion of data is too large to fit into an available free space, the allocator 42 can pass the size of the available free space back to the parameter selector 44, which can then select different compression parameters and the portion of data can be compressed again, so that the compressed portion of data will fit into the available free space. The parameter selector may also, of course, select the compression parameters so that the compresses portion of data has an optimum quality, and, it is found that that there is more available space than would be used for the size of the compressed portion of data, then the compression parameters can be (re)selected to reduce the compression to increase the quality of the compressed portion of data.

Also shown in FIG. 4 is an estimator 46, which obtains an estimate of the available free space from the map 18 via the free space list 32 and also obtains a size of the data queue 36 still awaiting compression and transfer. The estimator 46 then determines whether the frame buffer 28 has enough space for all the portions of data still in the data queue 36 if they were to be compressed using the normal compression parameters. If the estimator 46 determines that the frame buffer 28 of display control device 16 is expected to run out of space before all the display data of the current frame is compressed and sent, the estimator 46 provides that information to the parameter selector 44 so that the compression parameters can be adjusted in order to increase the compression of the portions of display data so that all remaining compressed display data of the current frame will fit into the frame buffer 28. Again, although the estimate of free space is described as being determined using the map 18, this is not essential, and any way of determining the available free space could be used.

Apart from determining whether the frame buffer 28 has enough space for all the portions of data still in the data queue 36 if they were to be compressed using the normal compression parameters, the estimator 46 can also control the parameter selector to select the compression parameters based on the time taken to send the compressed portion of data. For example, it is often the case that there is a maximum period of time available for a compressed portion of data to be transmitted from the processing device. This period may depend on the physical resources available for the transport mechanism, or may depend on the transport protocol being used. So, for example, a period of 16 ms may be a maximum period available. It is desirable, therefore, to select compression parameters which would reduce the size of the compressed portion of data sufficiently that it could be sent out in a time less than the maximum period. A target time, for example, 14 ms, may therefore be aimed at. A comparator 48 may be used to compare the timestamps from the transport mechanism 22 for previously sent compressed portions of data with the target time, to see whether the target time was being achieved, or whether the actual times for previously sent compressed portions of data were longer or shorter than the target time. Based on that comparison, the estimator 46 can then factor in whether previous compressions were too high or too low to achieve the target time with the optimum quality and can control the parameter selector to select compression parameters accordingly.

It will be appreciated that the target time is the time taken for the processing device to send out the compressed portions of data. Alternatively or additionally, the compression parameters can be selected to achieve the optimum quality based on the time taken for the compressed portions of data to be transmitted across the link from the processing device 10 to the display control device 16. This may depend on the resources available across that link.

The compression parameters may also be selected to make sure that frame buffer is filled in time before the frame buffer needs to be accessed for displaying the frame. For example, the time taken for a previous frame to be sent, transmitted and received may be used to select the compression parameters for the next frame. Furthermore, the compression parameters may also be selected based on the content of the previous frame of data. For example, a frame that comprises text may be compressed less than a frame that comprises video data.

Of course, it is possible that the allocator 42 is not be able to find sufficient free space in the frame buffer 28 for a portion of compressed data, even if it was (re) compressed at a higher compression. If the allocator 42 therefore determines that it cannot allocate space in the frame buffer to the compressed portion of data, it notifies an overflow condition 50, which sends a command to the clear the map 18 and to the data queue 36 to rewind the queue back to the beginning, i.e. to start compressing portions of the frame again. In this case, the parameter selector 44 would select compression parameters from the beginning of the frame to provide a higher compression so that it was more likely that all the frame would fit in the frame buffer. Since the map 18 was cleared, the new compressed portions of data would be allocated any appropriate available space in the frame buffer 28 based on the map 18, and they would, of course, overwrite in the frame buffer 28 anything that was already there. Although this process could be carried out for the existing frame that did not fit, if it were determined that there was not enough time for the frame to be (re)compressed and transmitted to the display control device before it needed to be accessed and displayed, then the frame could be skipped and the next frame could be processed, so that the problem frame was skipped at the display.

Figure 5:
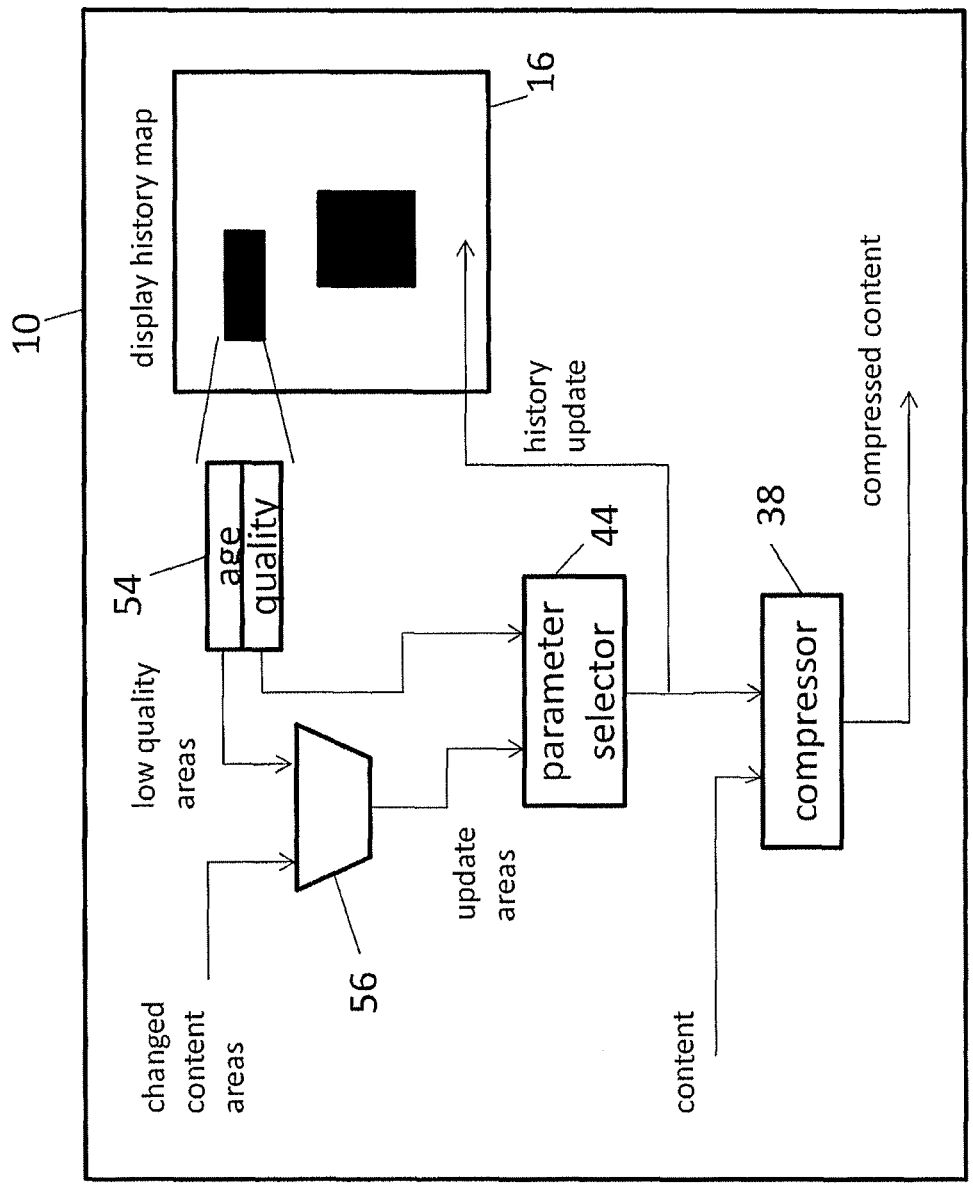
FIG. 5 shows other aspects of the processing device of FIG. 4.

FIG. 5 shows another aspect of the host device 10 in which the map 18, or a separate map, is maintained showing the various areas of the image. A listing 54 is kept for each of the areas of their age, i.e. when they were last sent and stored in the buffer memory, and their quality, i.e. the compression parameters that were used to compress the portion of display data. These parameters (age and quality) are used by the parameter selector 44 to adjust the compression parameters to improve the quality of portions of display data that were previously compressed with high compression. If a portion of display data, for example, was previously sent with low quality, then, when the area corresponding to that portion next needs to be resent, it would be desirable, perhaps subject to the constraints described above, to select compression parameters that provide a higher quality, so that the area of the image may be considered to be "healed".

A multiplexer/comparator 56 receives information as to which areas of the image have changed for which portions of display data are to be compressed and sent to the display control device. The multiplexer/comparator 56 can then determine whether the corresponding portion of display data previously sent was of low quality, or is of more than a predetermined age, and can then instruct the parameter selector to select compression parameters to compress that portion with a higher quality.

Alternatively or additionally, the multiplexer/comparator 56 may be used to receive information regarding when resources may be available. When resources are available, the multiplexor/comparator 56 can select a particular portion of display data that was previously sent in low quality, or is of more than a predetermined age and insert it into the queue for (re)compression at a higher quality (lower compression) to be (re)sent to the display control device to "heal" the image. The resources that may be available may be resources at the host device for compressing the portions of display data, resources at the display control device for receiving the compressed portions of display data, and/or resources at the transport mechanism for transporting the compressed portions of display data from the host device to the display control device. It may be that when no or little new data is required to be sent, then more and more of the image can be healed in this way by sending through higher quality portions of data than were previously sent.

Figure 6:
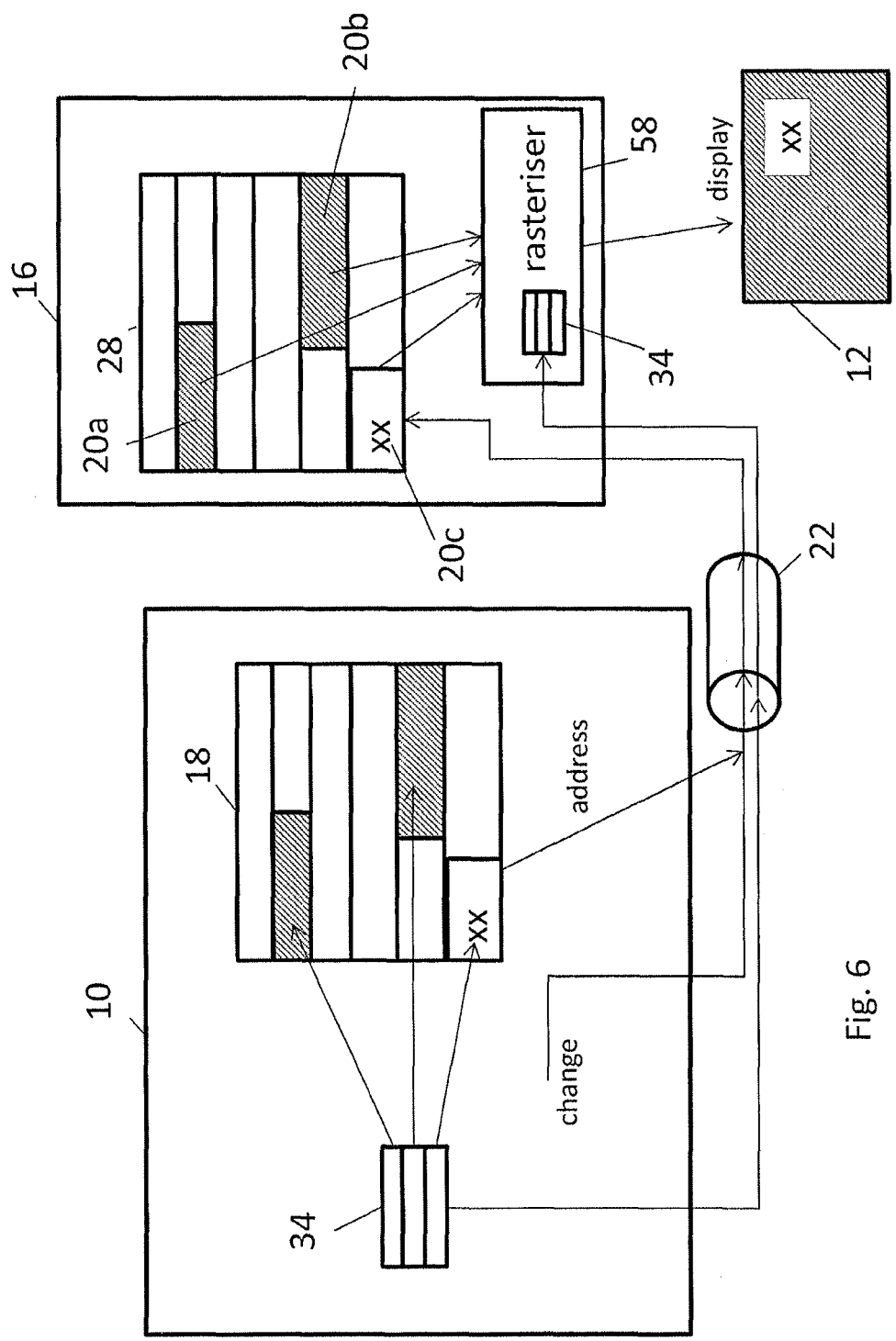
FIG. 6 shows other aspects of the buffer memory management system of FIG. 3.

FIG. 6 shows an embodiment of the system, similar to FIG. 3, in which portion 20c of compressed data stored in the frame buffer 28 is only a partial update of the portion of information for that area of the image. As will be apparent, if an area of the image is generally very similar to the same area in the previous frame, with just a small change (designated by "XX"), then a partial update providing only that small change and otherwise indicating that the rest of the area remains the same as before. This can reduce the amount of data, that needs to be sent from the processing device 10 to the display control device 16. The partial update is, of course indicated in the map 18 and the display list 34. The display list 34 is, as previously explained sent to the display control device 16, where it is used by the rasteriser 58 to appropriately access the data from the frame buffer and generate the raster image, with the changed portion XX to the display 12.

Figure 7:
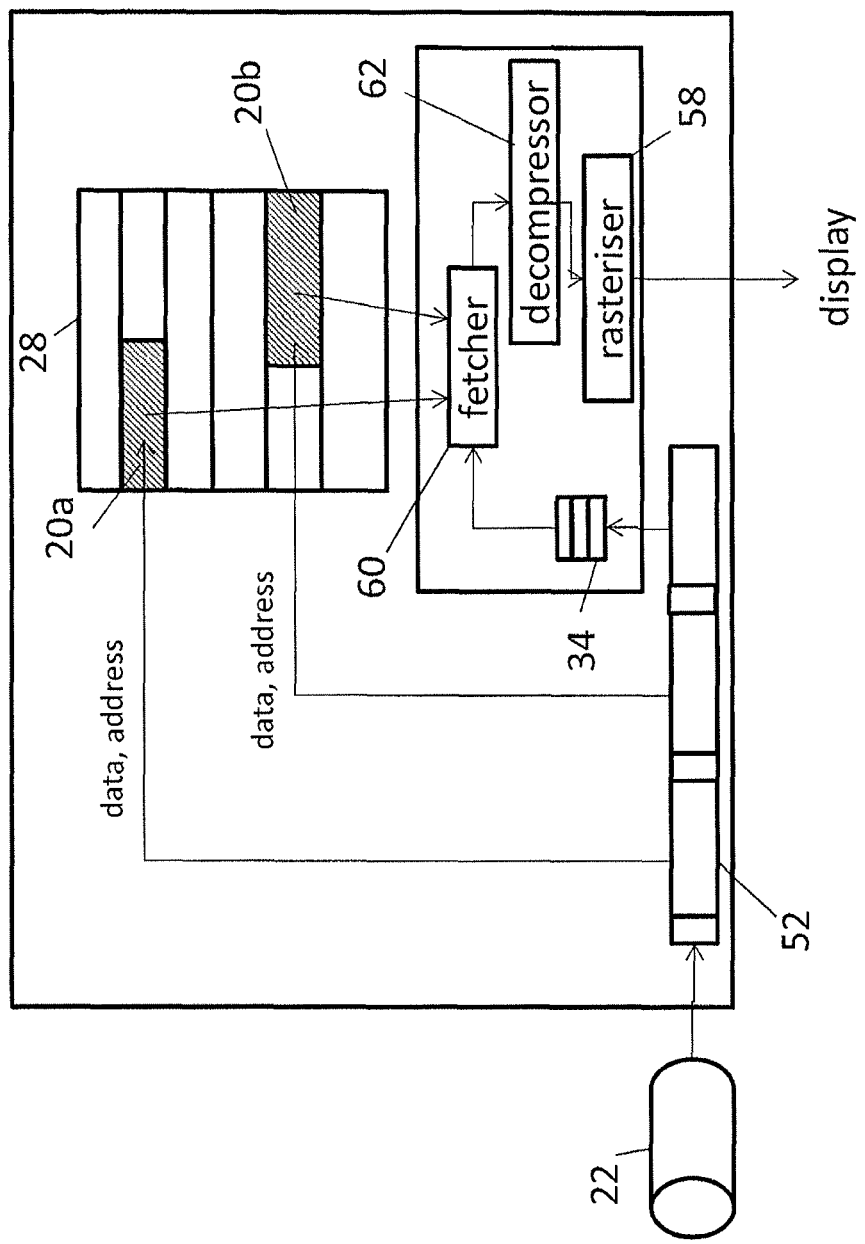
FIG. 7 shows other aspects of the display control device of FIG. 2.

FIG. 7 shows an alternative embodiment of the display control device 16. As shown, the data stream 52, such as that produced by the processing host device of FIG. 3, is received via the transport mechanism 22 and the data portions, which in this embodiment are compressed, are stored in the frame buffer 28 according to the addresses sent with the data portions in the data stream 52 from the host device. The display list 34 indicates the order in which the display portions are to be displayed to a fetcher 60, which fetches the compressed portions 20a and 20b of display data from the appropriate locations in the frame buffer 28 in the order provided by the display list 34. The compressed portions 20a and 20b of display data are then passed to a decompressor 62, which decompresses them, and passes them to the rasteriser 58 to produce the rasterised image for display.

Figure 8:
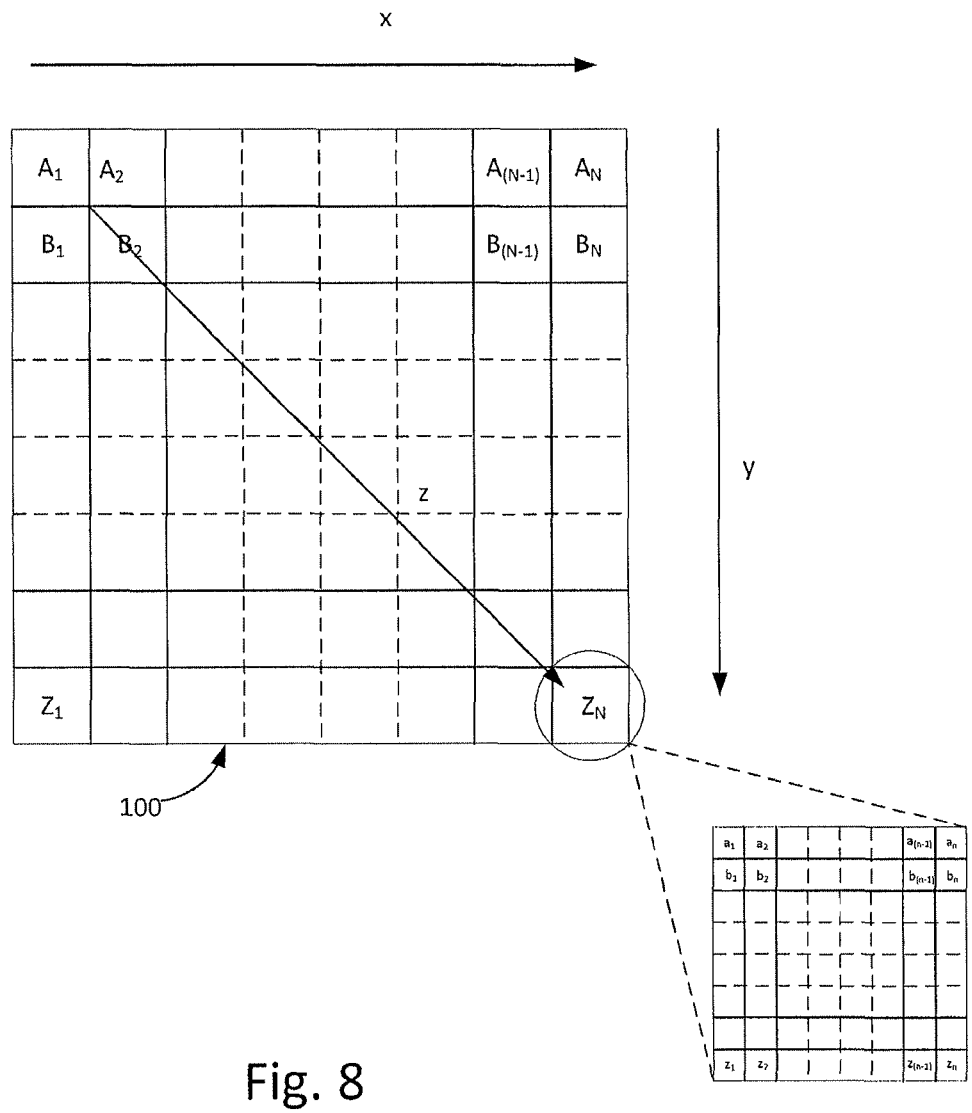
FIG. 8 shows a schematic illustrates of a conventional direction of reading a frame of image data.

FIG. 8 shows a frame of the image 100. Image 100 comprises a plurality of tiles, $A_1, A_2, \ldots, A_{(N-1)}, A_N, B_1, \ldots B_N, \ldots, Z_1, \ldots Z_N$. Each tile comprises a plurality of pixels. As illustrated, the tile ZN comprises pixels a1, . . . an, b1, . . . , bn, . . . , z1, . . . zn. Arrows x, y and show a usual direction of reading the tiles of image 100 in a raster format display system.

As will be understood by readers skilled in the art, the term tile is used to denote a portion of an image. Tiles may be rectangular, which may include square. The term tile in the following description specifically refers to a rectangular portion of compressed or uncompressed image data of image 100. In general, the image data in a given tile may be compressed to increase transport efficiency, for example, to produce a compressed tile. In the description relating to FIG. 11, a transport stream 52 comprises compressed tiles 20, each of which corresponds to a (non-compressed) tile of the image 100.

Image 100 comprises rows of tiles, A to Z in a standard raster format. Each tile has a tile address denoting its position in the image 100. In the illustrated example, tiles addresses are represented by a row position, A, B . . . Z, and a column position 1, 2, . . . N. In known display systems comprising a raster format display, rows are read sequentially from the top to the bottom of the image, i.e. from A to Z as indicated by arrow y. Each row is read in its entirely from the first tile, e.g. $A_1$, to the last tile e.g. $A_N$, before moving to the next row. Thus the reading order of known raster systems mimics a normal reading order, which is denoted by the arrow z.

Figure 9:
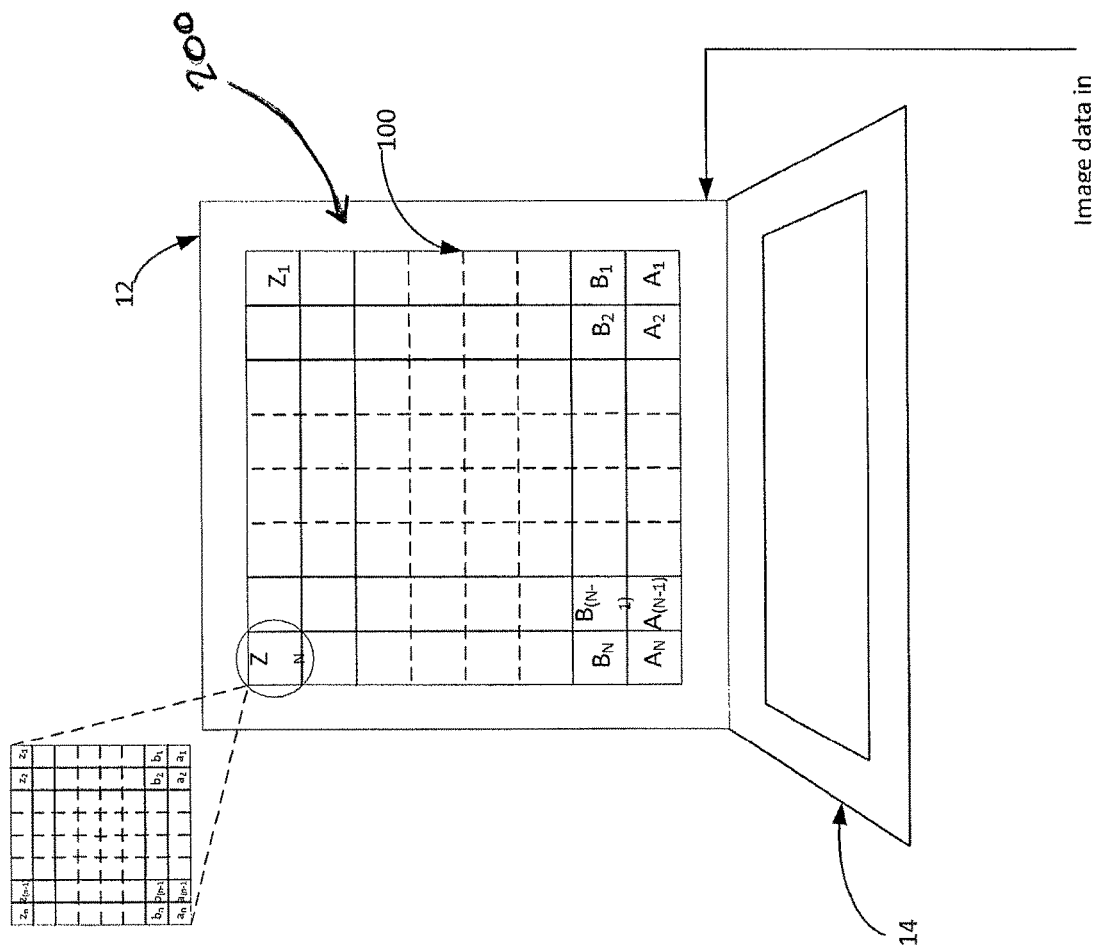
FIG. 9 shows a display device displaying an inverted image.

In FIG. 9, display device 12 comprises an LCD or OLED display, which receives image data via a signal connector connected beneath display area 200. In the illustrated example, the image is received at the bottom right corner of the display area 200, but in another example it is received at the bottom left corner. What is pertinent is that the image data is received beneath the display area 200.

A display control device coupled to the image display reads the image data in the order described in relation to FIG. 8. As a result, the display device 12 displays image 100 in an inverted orientation, with the last tile, that is the tile with the highest tile address, $Z_N$, displayed first and the first tile, that is the tile with the lowest address, $A_1$, displayed last. It will be appreciated that such a display has little user utility until or unless corrected via an appropriate transformation. As described above, a conventional computer operating system may provide software to invert the image in response to receiving a request to do so via the user interface 14.

Figure 10:
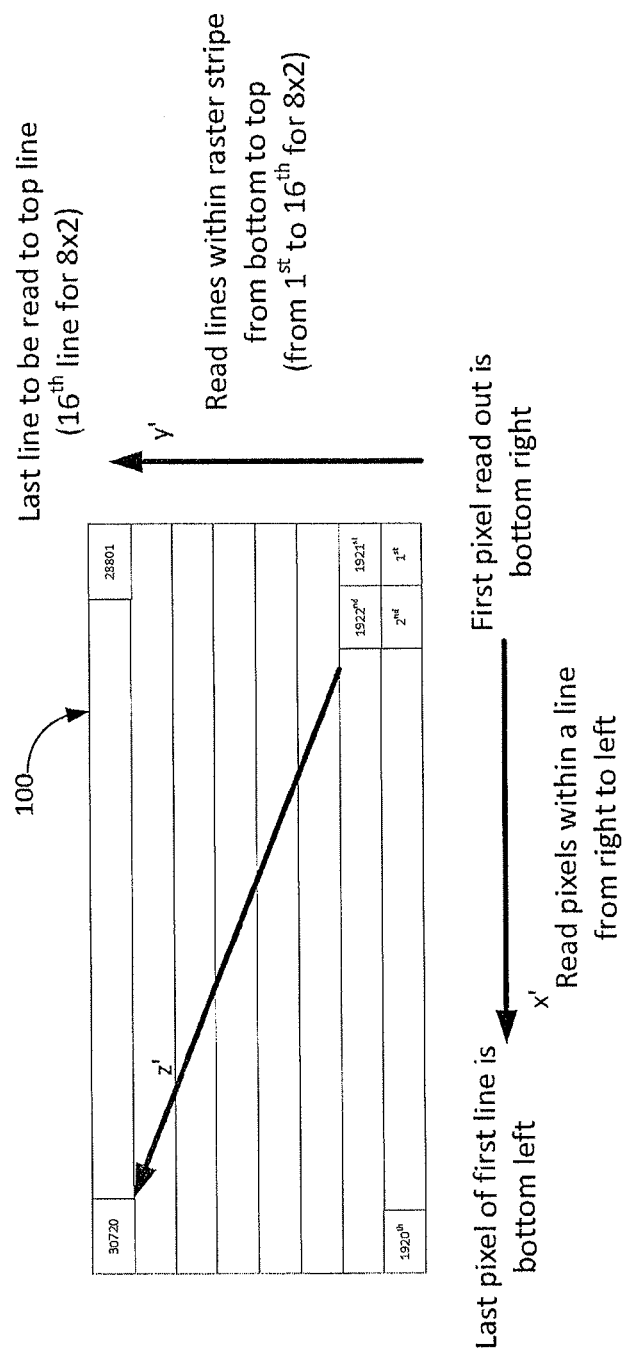
FIG. 10 shows a direction of reading a frame of image data according to embodiments of the invention.

FIG. 10 shows a schematic illustration of a tile reading order according to embodiments of the invention. The image 100 illustrated is an inverted image such as that shown in FIG. 9. In the FIG. 10 example, tiles of image 100 are read in reverse raster order, z', that is from the bottom row to the top row sequentially, indicated by arrow y', and reading each row in its entirely before moving to the next row, a indicated by arrow x'. If the image were rastered to a display at this point, the image would display a "venetian blind" effect resulting from the fact that the pixels of each tile have not been reordered. The display control device 16 of FIG. 11 remedies this problem by providing a different pixel order as described below.

Figure 11:
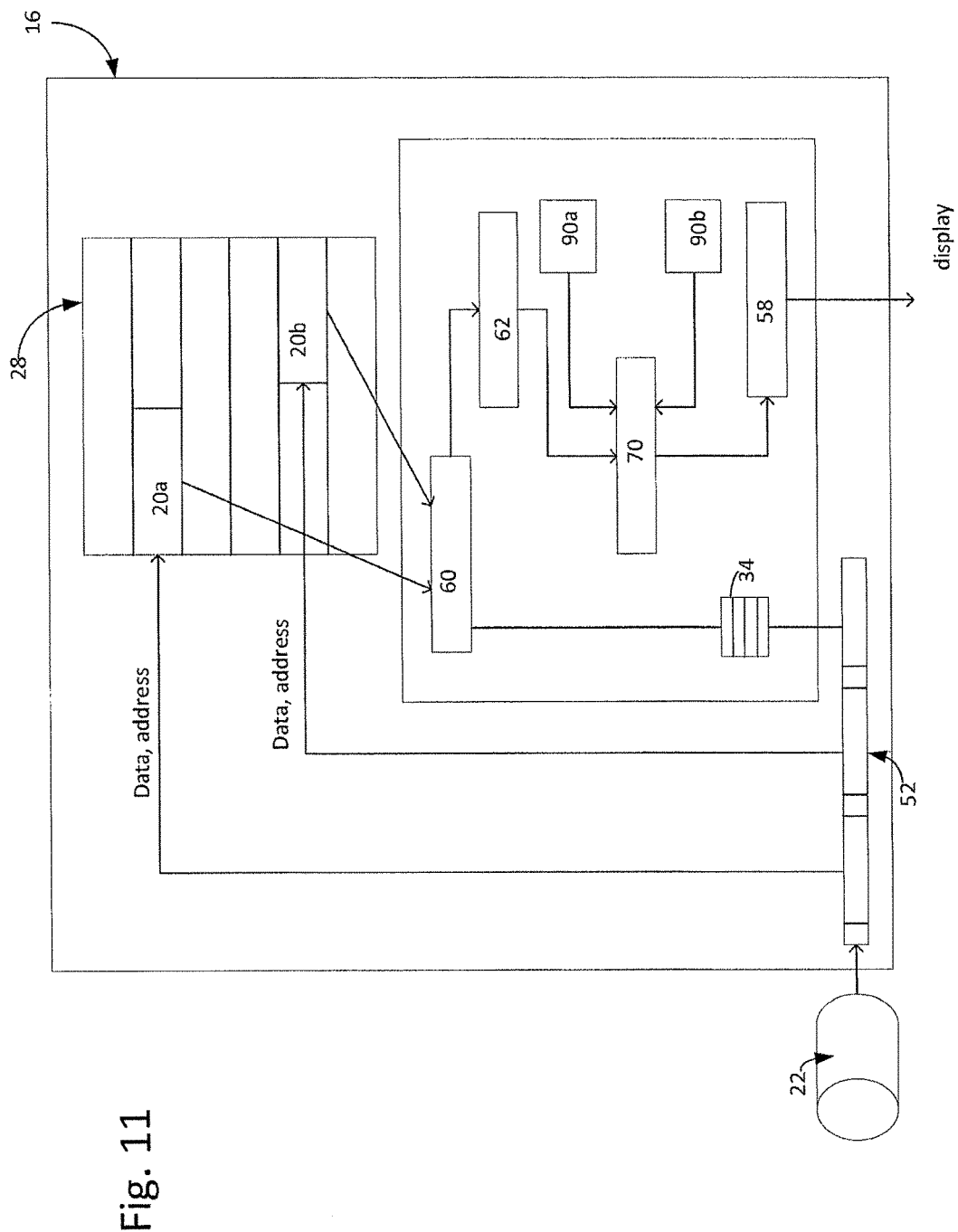
FIG. 11 shows a display control device for providing transformed image data.

FIG. 11 shows an embodiment of a display control device 16 for providing transformed image data to a display. In this example, the display control device 16 receives a frame update corresponding to an image, such as image 100 shown in FIG. 8, the image 100 requiring a full inversion before being displayed on a display device 12. The illustrated example assumes that tiles of the image 100 are compressed by the host device 10 before being passed to the transport protocol, and that the resultant compressed tiles, or data portions, are received and stored in compressed form at the display control device 16.

Display control device 16 has a frame buffer 28 arranged to receive image data sent in a data stream 52 by the host device. A fetcher 60 is arranged to receive an input from the frame buffer 28 and to provide an output to the decompressor 62. The decompressor 62 is arranged to provide an output to a flow control buffer 70. The flow control buffer 70 is arranged to receive further inputs from a write address generator 90a and a read address generator 90b. The flow control buffer 70 is coupled to provide an output to the rasteriser 58. The rasteriser 58 is coupled to provide transformed image data to the display 200. In a preferred example, the address generators 90 are provided by logic gates, however it will be appreciated that the address information could be provided by software or any other appropriate mechanism.

In operation, the data stream 52 comprising the compressed tiles 20, such as the data stream produced by the processing host device of FIG. 3, is received via the transport mechanism 22. The data stream 52 also comprises address information for each compressed tile, the address information corresponding to the addresses of memory locations in the frame buffer 28. Address information for each compressed tile indicates the memory location to which the compressed tile 20 should be written. Also included in the data stream 52 is display order information 34 to enable the fetcher 60 to retrieve compressed tiles 20 from the frame buffer 28 in a desired order. Display order information 34 is referred to as a tile list elsewhere in this application.

The address information is provided by the host device 10 based on the map of the frame buffer 28 which is maintained at the host device 10, as described herein.

Each received compressed tile 20 is written to a memory location in the frame buffer 28 according to its address information. When the frame buffer 28 has been updated with all of the compressed tiles 20 of the frame update, the fetcher 60 begins taking compressed tiles from the frame buffer 28 and writing them to the decompressor 62 in an order given by the display order information (tile list 34).

In general, the display order information 34 is determined based on the nature of the image transformation required. When a full image inversion is required, as in the present example, the display order information provides a reversed tile order which requires the fetcher 60 to take compressed tiles from the frame buffer 28 in such an order as that illustrated in FIG. 8. New display order information 34 is sent with each successive frame update.

The decompressor 62 decompresses the compressed tiles 20 by performing suitable operations, such as those described in relation to FIG. 2. For each compressed tile 20, the decompressor outputs decompressed pixel data to the flow control buffer 70. The decompressed pixels are written to the flow control buffer 70 in an order determined by information supplied by the write address generator 90a. A function of the flow control buffer 70 is to ensure a steady flow of data between the decompressor 62, which typically has a bursty output, and the rasteriser 58, which typically takes a linear input.

In the current embodiment, the write address generator 90a is a normal mode pointer which provides linear in-order addressing. This means that the decompressed pixels of each compressed tile are provided to the flow control buffer 70 in the order in which they are transmitted by the host 10, that is the order shown in FIG. 9. At this stage, therefore, the tile order has been changed (reversed) but the pixel order is the same as in the original image 100.

Decompressed pixels are taken from the flow control buffer 70 in an order determined by information supplied by the read address generator 90b. In this example, the read address generator 90b is a modified pointer configured to generate linear in-order addressing, i.e. reverse-order addressing. The pixel order per tile is thus reversed when the pixels are read from the flow control buffer 70. The pixels are written to the rasteriser 58 in the order in which they are taken from the flow control buffer 70. In this way, the rasteriser is provided decompressed pixel data in a reversed tile order and a reversed pixel order. The decompressed image data having been doubly inverted, the rasteriser 58 then rasters the decompressed image data to the display 200. Typically, data is rastered to the display 200 each time the rasteriser 58 is full. In a preferred option, the rasteriser 58 comprises a raster stripe buffer. However, the skilled reader will appreciate that any appropriate form of memory could be used. Typically, the raster stripe buffer has a width equal to the width of a row of the image 100 so that a full row of image data is rastered to the display each time a rastering operation is performed. Rows are rastered one at a time in conventional fashion, from top left to bottom right as illustrated in FIG. 8. In this way, a fully inverted image is provided to the display.

Alternatives and Variations

The described embodiment relates to a full image inversion. However, it will be appreciated by those skilled in the art that the two-stage transformation technique described herein may also be used to generate other transformations, including 90 degree rotations in either direction, or a landscape format to portrait format transformation, for example. When a 90 degree rotation is required, the host device provides display order information providing a reversed tile-column order of the image 100. In this example, the display order information would require data portions to be taken from the frame buffer beginning with $A_1$ and proceeding to take the first tile of each row ($B_1$, $C_1$ etc) before proceeding to take the second tile of each row ($A_2$, $B_2$, etc) and proceeding across the columns sequentially. By providing display order information specifying a start point at any of the four corners $A_1$, $A_N$, $Z_1$ or $Z_N$, and changing either the tile-column order or the tile-row order, it will be appreciated that various transformations may be generated. To achieve certain transformations, the tile order and/or pixel order need not be reversed, but need only be different than in the original image 100.

The above example relates to the case where tiles of the image 100 are compressed by the host 10 prior to the transport stage. It will be appreciated that the two-stage transformation technique described herein is also applicable to non-compressed data. In the case where data is not compressed before being sent by the host 10, display order information is still sent with each frame update to change the tile order, and pixel data for each tile is still reordered in the display control device so that the display is provided with image data having a different tile order and a different pixel order than the original image 100.

Although in the described example the display order information is automatically sent by the host 10, in another example, display order information is requested by the display control device 16 in response to determining that image data needs transforming. Equally, although in the described example the different (e.g. reversed) pixel order is automatically implemented in the display control device 16, in another example, the display control device implements a different pixel order based on receiving an instruction, for example a flag, from the host device 10, indicating that an image transformation is required.

Although several embodiments have been described in detail above, it will be appreciated that various changes, modifications and improvements can be made by a person skilled in the art without departing from the scope of the present invention as defined in the claims.

The invention claimed is:

1. A method, at a display control device, for transforming image data, the method comprising:

receiving variable-sized portions of compressed image data from a host device the over a limited bandwidth transmission channel, each variable-sized portion of compressed image data corresponding to a tile of an image, the image being divided into a plurality of tiles in a particular tile order, each tile comprising pixels in a particular pixel order, the variable-sized portions of compressed image data being received in any order;

receiving, from the host device, memory addresses indicating where the variable-sized portions of compressed image data should be stored in a memory, a transformed image memory map mapping the memory addresses to a transformed image tile order providing an order in which the tiles should be provided to a display device to display a transformed image, and transforming processing information providing information of how to process each of the variable-sized portions of compressed image data to transform the particular pixel order to a transformed pixel order corresponding to the transformed image;

storing the received variable-sized portions of compressed image data in the memory at the received memory addresses;

using the transformed image memory map to access the variable-sized portions of compressed image data from the memory in the transformed image tile order;

decompressing each variable-sized portion of compressed image data using a variable decompression algorithm and processing each variable-sized portion of compressed image data using the transforming processing information to produce a transformed tile having a transformed pixel order; and providing the transformed tiles in the transformed tile order to the display device for displaying the transformed image.

2. The method of claim 1, wherein the transformed tile order is a reverse of the particular tile order, and the transformed pixel order is the reverse of the particular pixel order, to provide a transformed image rotated by 180 degrees on the display device.

3. The method of claim 1, wherein the particular tile order is based on a tile row order and the particular pixel order is based on a pixel row order, and the transformed tile order is based on a tile column order and the transformed pixel order is based on a pixel column order, to provide transformed image data corresponding to a 90 degree rotation of the image data.

4. The method of claim 1, wherein processing each variable-sized portion of compressed image data using the transforming processing information to produce a transformed tile having the transformed pixel order comprises reading decompressed pixel data in a first order and writing the decompressed pixel data to a display buffer in a second order, the second order different from the first order.

5. A method according to claim 1, further comprising, for subsequent transformed images, receiving updated variable-sized compressed portions of image data from the host device, the updated variable-sized compressed portions of image data corresponding to tiles of a subsequent image that have changed as compared to a previous image, decompressing only the updated variable-sized compressed portions of image data using the variable compression algorithm and processing only the updated variable-sized compressed portions of image data using the transforming processing information to produce changed transformed tiles, and updating the display using the changed transformed tiles to display a subsequent transformed image.

6. A method, at a host device, for displaying a transformed image, the method comprising:

obtaining an image, the image being divided into a plurality of tiles in a particular tile order, each tile comprising pixels in a pixel order;

compressing each tile of the image using a variable compression algorithm to produce variable-sized portions of compressed image data, each variable-sized compressed portion of image data corresponding to a tile of the image;

determining a memory address for each variable-sized portion of compressed image data where that variable-sized portion of compressed image data is to be stored in a memory at a display control device, such that the variable-sized portions of compressed image data are packed in an order that reduces unused space in the memory;

maintaining, at the host device, a map of the memory addresses of the variable-sized portions of compressed image data to be stored in the memory at the display control device;

determining a transformed image memory map by mapping the memory addresses to a transformed image tile order in which the tiles should be provided by the display control device to a display to display a transformed image;

determining transforming processing information providing information of how to process each of the variable-sized portions of compressed image data to transform the particular pixel order to a transformed pixel order corresponding to the transformed image;

sending the variable-sized portions of compressed image data, the memory addresses, the transformed image memory map, and the transforming processing information to the display control device.

7. The method of claim 6, wherein the transformed tile order is a reverse of the particular tile order to allow display of a transformed image rotated by 180 degrees.

8. The method of claim 6, wherein the particular tile order is based on a tile row order and the particular pixel order is based on a pixel row order, and the transformed tile order is based on a tile column order and the transformed pixel order is based on a pixel column order, to provide transformed image data corresponding to a 90 degree rotation of the image data.

9. A method according to claim 6, further comprising, for subsequent images, determining which tiles have changed as compared to a previous image, compressing only the changed tiles using the variable compression algorithm to produce updated variable-sized compressed portions of image data, and sending the updated variable-sized compressed portions of image data to the remote device.

10. A tangible, non-transitory computer readable medium including executable instructions which, when executed in a processing system, cause the processing system to perform functions comprising:

receive variable-sized portions of compressed image data from a host device over a limited bandwidth transmission channel, each variable-sized portion of compressed image data corresponding to a tile of an image, the image being divided into a plurality of tiles in a particular tile order, each tile comprising pixels in a particular pixel order, the variable-sized portions of compressed image data being received in any order;

receiving, from the host device, memory addresses indicating where the variable-sized portions of compressed image data should be stored in a memory, a transformed image memory map mapping the memory addresses to a transformed image tile order providing an order in which the tiles should be provided to a display device to display a transformed image, and transforming processing information providing information of how to process each of the variable-sized portions of compressed image data to transform the particular pixel order to a transformed pixel order corresponding to the transformed image;

store the received variable-sized portions of compressed image data in the memory at the memory addresses;

use the transformed image memory map to access the variable-sized portions of compressed image data from the memory in the transformed image tile order;

decompress each variable-sized portion of compressed image data using a variable decompression algorithm and processing each variable-sized portion of compressed image data using the transforming processing information to produce a transformed tile having a transformed pixel order; and provide the transformed tiles in the transformed tile order to the display device for displaying the transformed image.

11. A tangible, non-transitory computer readable medium in accordance with claim 10, wherein the particular tile order is based on a tile row order and the particular pixel order is based on a pixel row order, and the transformed tile order is based on a tile column order and the transformed pixel order is based on a pixel column order, to provide transformed image data corresponding to a 90 degree rotation of the image data.

12. A tangible, non-transitory computer readable medium in accordance with claim 10, further comprising, for subsequent transformed images, receiving updated variable-sized compressed portions of image data from the host device, the updated variable-sized compressed portions of image data corresponding to tiles of a subsequent image that have changed as compared to a previous image, decompressing only the updated variable-sized compressed portions of image data using the variable compression algorithm and processing only the updated variable-sized compressed portions of image data using the transforming processing information to produce changed transformed tiles, and updating the display using the changed transformed tiles to display a subsequent transformed image.

13. A display control device comprising:

a receiver configured to receive variable-sized portions of compressed image data from a host device over a limited bandwidth transmission channel, each variable-sized portion of compressed image data corresponding to a tile of an image, the image being divided into a plurality of tiles in a particular tile order, each tile comprising pixels in a particular pixel order, the variable-sized portions of compressed image data being received in any order and to receive memory addresses indicating where the variable-sized portions of compressed image data should be stored in a memory, a transformed image memory map mapping the memory addresses to a transformed image tile order providing an order in which the tiles should be provided to a display device to display a transformed image, and transforming processing information providing information of how to process each of the variable-sized portions of compressed image data to transform the particular pixel order to a transformed pixel order corresponding to the transformed image;

a memory configured to store the received variable-sized portions of compressed image data at the received memory addresses;

a generator configured to use the transformed image memory map to access the variable-sized portions of compressed image data from the memory in the transformed image tile order and to decompress each variable-sized portion of compressed image data using a variable decompression algorithm and to process each variable-sized portion of compressed image data using the transforming processing information to produce a transformed tile having a transformed pixel order; and an output configured to provide the transformed tiles to the display device for displaying the transformed image.

14. The display control device of claim 13, wherein the transformed tile order is a reverse of the particular tile order, and the transformed pixel order is the reverse of the particular pixel order, to provide a transformed image rotated by 180 degrees on the display device.

15. The display control device of claim 13, wherein the particular tile order is based on a tile row order and the particular pixel order is based on a pixel row order, and the transformed tile order is based on a tile column order and the transformed pixel order is based on a pixel column order, to provide transformed image data corresponding to a 90 degree rotation of the image data.

16. A display control device according to claim 13, wherein the receiver is configured to receive, for subsequent transformed images, updated variable-sized compressed portions of image data from the host device, the updated variable-sized compressed portions of image data corresponding to tiles of a subsequent image that have changed as compared to a previous image, and wherein the generator is configured to decompress only the updated variable-sized compressed portions of image data using the variable compression algorithm and to process only the updated variable-sized compressed portions of image data using the transforming processing information to produce changed transformed tiles, and the output configured to provide the changed transformed tiles to the display device to display a subsequent transformed image.

17. A host device for displaying a transformed image, wherein the image is divided into a plurality of tiles in a particular tile order, each tile comprising pixels in a pixel order, the host device comprising:

a compressor configured to compress each tile of the image using a variable compression algorithm to produce variable-sized portions of compressed image data, each variable-sized compressed portion of image data corresponding to a tile of the image;

a memory packer configured to determine a memory address for each variable-sized portion of compressed image data where that variable-sized portion of compressed image data is to be stored in a memory at a display control device, such that the variable-sized portions of compressed image data are packed in an order that reduces unused space in the memory;

a memory configured to maintain a map of the memory addresses of the variable-sized portions of compressed image data to be stored in the memory at the display control device;

a controller configured to determine a transformed image memory map by mapping the memory addresses to a transformed image tile order in which the tiles should be provided by the display control device to a display to display a transformed image and to determine transforming processing information providing information of how to process each of the variable-sized portions of compressed image data to transform the particular pixel order to a transformed pixel order corresponding to the transformed image;

an output configured to send the variable-sized portions of compressed image data, the memory addresses, the transformed image memory map, and the transforming processing information to the display control device.

18. The host device of claim 17, wherein the transformed tile order is a reverse of the particular tile order to allow display of a transformed image rotated by 180 degrees.

19. The host device of claim 17, wherein the particular tile order is based on a tile row order and the particular pixel order is based on a pixel row order, and the transformed tile order is based on a tile column order and the transformed pixel order is based on a pixel column order, to provide transformed image data corresponding to a 90 degree rotation of the image data.

20. A host device according to claim 17, wherein the host device is configured to determine, for subsequent images, which tiles have changed as compared to a previous image, and wherein the compressor configured to compress only the changed tiles using the variable compression algorithm to produce updated variable-sized compressed portions of image data, and the output configured to send the updated variable-sized compressed portions of image data to the remote device.

* * * * *